(12) United States Patent
Kobayashi

(10) Patent No.: US 10,582,071 B2
(45) Date of Patent: Mar. 3, 2020

(54) SERVICE USE SUPPORT DEVICE, SERVICE USE METHOD, AND COMPUTER PROGRAM

(71) Applicant: KONICA MINOLTA, INC., Chiyoda-ku, Tokyo (JP)

(72) Inventor: Minako Kobayashi, Ikeda (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/265,433

(22) Filed: Feb. 1, 2019

(65) Prior Publication Data
US 2019/0260885 A1 Aug. 22, 2019

(30) Foreign Application Priority Data
Feb. 20, 2018 (JP) ................................ 2018-027743

(51) Int. Cl.
*H04N 1/00* (2006.01)
*H04N 1/48* (2006.01)
*H04L 12/14* (2006.01)
*H04N 1/32* (2006.01)

(52) U.S. Cl.
CPC ..... *H04N 1/00411* (2013.01); *H04L 12/1453* (2013.01); *H04N 1/00127* (2013.01); *H04N 1/00143* (2013.01); *H04N 1/00498* (2013.01); *H04N 1/00801* (2013.01); *H04N 1/32* (2013.01); *H04N 1/48* (2013.01)

(58) Field of Classification Search
CPC .......... H04N 1/00411; H04N 1/00143; H04N 1/00801; H04N 1/48; H04N 1/00498; H04N 1/00127; H04N 1/32; H04L 12/1453

USPC ........................................................ 358/1.13
See application file for complete search history.

(56) References Cited

U.S. PATENT DOCUMENTS

| 6,804,016 B2* | 10/2004 | Hashimoto | H04N 1/00236 358/1.1 |
| 8,264,711 B2* | 9/2012 | Takahashi | H04N 1/00204 358/1.13 |
| 2005/0206939 A1* | 9/2005 | Tsutsumi | G06Q 30/04 358/1.13 |
| 2011/0019821 A1* | 1/2011 | Kino | G03G 21/02 380/255 |
| 2014/0101725 A1* | 4/2014 | Shinoda | G06F 21/41 726/4 |
| 2018/0275927 A1* | 9/2018 | Sekine | G06F 3/129 |

FOREIGN PATENT DOCUMENTS

| JP | 2006333041 A | 12/2006 |
| JP | 2011009932 A | 1/2011 |
| JP | 2016189541 A | 11/2016 |

\* cited by examiner

*Primary Examiner* — Allen H Nguyen
(74) *Attorney, Agent, or Firm* — Buchanan Ingersoll & Rooney PC

(57) ABSTRACT

A service use support device used for receiving a plurality of services, includes a hardware processor that: acquires one or more of target images to be processed; selects a preferred service from among the plurality of services for each of the one or more of target images on the basis of a degree at which each attribute satisfies a condition set for each of the plurality of services; and transfers each of the one or more of target images to a provider that provides each preferred service.

11 Claims, 17 Drawing Sheets

RECEIPT     DECEMBER 19, 2017

TO ABC COMPANY     DEF COMPANY

| PRODUCT NAME | QUANTITY | AMOUNT OF MONEY |
|---|---|---|
| FLOWER BOUQUET | 2 | 5,000 |
| GIFT-WRAPPING | 2 | 700 |
| SHIPPING COST | 1 | 1,800 |
| TOTAL | 5 | 7,500 |

7A3, 7A

RECEIPT     DECEMBER 22, 2017

TO ABC COMPANY     GH COMPANY

AMOUNT RECEIVED ¥10,000-

AS FLOWER BOUQUET BILL

7A4, 7A

SUZUKI SHIGERU

GH COMPANY

O-O-O, HIROMACHI, SHINAGAWA-KU, TOKYO

TEL: 03-1111-2222 suzuki@gh.xxx.xx

7A1, 7A

ABC COMPANY

TANAKA MINORU

O-O-O, UMEDA, KITA-KU, OSAKA

TEL: 06-1234-5678 tanaka@abc.xxx.xx

7A2, 7A

DEF COMPANY

SATO KIYOSHI

O-O-O, NISHINAKAJIMA, YODOGAWA-KU, OSAKA

TEL: 06-9876-5432 sato@def.xxx.xx

FIG. 5

IS IT OKAY TO PROCESS THIS DOCUMENT (IMAGE) THROUGH EXPENSE SETTLEMENT SERVICE?

8A

RECEIPT
DECEMBER 22, 2017
GH COMPANY
TO ABC COMPANY

AMOUNT RECEIVED ¥10,000-
AS FLOWER BOUQUET BILL

7A3, 7A

APPLY
8A1

CANCEL
8A2

FIG. 6

IS IT OKAY TO PROCESS THESE DOCUMENTS (IMAGES) THROUGH EXPENSE SETTLEMENT SERVICE?

8B

7A1, 7A

ABC COMPANY
TANAKA MINORU
O-O-O, UMEDA, KITA-KU, OSAKA
TEL: 06-1234-5678
tanaka@abc.xxx.xx

7A4, 7A

SUZUKI SHIGERU
GH COMPANY
O-O-O, HIROMACHI, SHINAGAWA-KU, TOKYO
TEL: 03-1111-2222
suzuki@gh.xxx.xx

7A2, 7A

DEF COMPANY
SATO KIYOSHI
O-O-O, NISHINAKAJIMA, YODOGAWA-KU, OSAKA
TEL: 06-9876-5432
sato@def.xxx.xx

APPLY — 8B1

CANCEL — 8B2

IS IT OKAY TO PROCESS THESE DOCUMENTS (IMAGES) THROUGH EXPENSE SETTLEMENT SERVICE?

7A1, 7A
ABC COMPANY
TANAKA MINORU
O-O-O, UMEDA, KITA-KU, OSAKA
TEL: 06-1234-5678
tanaka@abc.xxx.xx 7A2, 7A
DEF COMPANY
SATO KIYOSHI
O-O-O, NISHINAKAJIMA, YODOGAWA-KU, OSAKA
TEL: 06-9876-5432
sato@def.xxx.xx 7A4, 7A
SUZUKI SHIGERU
GH COMPANY
O-O-O, HIROMACHI, SHINAGAWA-KU, TOKYO
TEL: 03-1111-2222
suzuki@gh.xxx.xx 8C22, 8C2 — BUSINESS CARD MANAGEMENT
8C21, 8C2 — EXPANSE SETTLEMENT
8C23, 8C2 — TRANSLATE
8C24, 8C2 — MY NUMBER

8C1

SERVICE USE SUPPORT DEVICE, SERVICE USE METHOD, AND COMPUTER PROGRAM

The entire disclosure of Japanese patent Application No. 2018-027743, filed on Feb. 20, 2018, is incorporated herein by reference in its entirety.

BACKGROUND

Technological Field

The present invention relates to a technique for receiving a service provided by a cloud server or the like.

Description of the Related Art

An image forming device in which functions such as copying, network print, a facsimile, scanning, and a file server are aggregated has become widespread. Such an image forming device is referred to as a "multi function peripheral (MFP)" or the like.

Further, servers such as a cloud server or a web server are installed on the Internet, and various services are provided.

A user can receive a service provided by the server by causing an image forming device to be connected with a server via a communication line. For example, it is possible to cause an image forming device to read an image of a business card, transmit the image to a server, and cause the server to manage the business card.

In recent years, various services are provided through a plurality of servers. Therefore, the user has to select a destination to which the image read by the image forming device is given depending on a service desired to be received. The following techniques have been proposed as a technique for deciding the destination to which the image is given.

In a copying system disclosed in JP 2016-189541 A, a recording device controller causes a recording unit to record a specific code indicating communication information specifying a recording device communication unit, receives image data via a recording device communication unit, and causes the recording unit to record the image using the received image data. A scanning device controller causes a scanning unit to scan an original, generates image data, analyzes the generated image data, determines whether or not a specific code is included in units of pages of the original, acquires communication information indicated by the specific code when the specific code is determined to be included in the image data, and transmits image data generated in a scanning process for at least some of pages scanned after a page including the specific code in the original to a communication destination specified by the communication information via a scanning device communication unit.

An image forming device disclosed in JP 2011-9932 A is an image forming device that includes a scanner unit that scans an image of an original and has a copy mode in which an image of a scanned original is transferred onto a sheet and a transmission mode in which the image of the scanned original is transmitted to another device (via a facsimile or an e-mail), and the image forming device includes a controller that analyzes the image of the scanned original, determines whether or not destination information is included in the image of the original, and sets an operation mode to the transmission mode when the destination information is included.

A communication terminal device disclosed in JP 2006-333041 A functions as a G3 facsimile device that transmits transmission original data (image data) related to a transmission original as transmission data via a general public telephone network and also functions as an Internet facsimile device that attaches transmission original data related to a transmission original to an e-mail and transmits the resulting e-mail via the Internet. An image scanning unit of the communication terminal device scans a scanning target object placed on a glass plate in accordance with an FBS scheme and generates image data. In the communication terminal device, the transmission destination of the transmission original data is decided on the basis of the image data generated by scanning the business card placed in a transmission destination business card scanning area of the glass plate through an image scanning unit.

Services provided by the servers such as the cloud server or the web server are considered to increase more and more in the future. Further, stand-alone services provided by an application in a device such as an image forming device are considered to increase as well.

SUMMARY

The present invention was made in light of the foregoing, and it is an object of the present invention to give an image to a service provider more easily than in a related art in order to receive a service.

To achieve the abovementioned object, according to an aspect of the present invention, there is provided a service use support device used for receiving a plurality of services, and the service use support device reflecting one aspect of the present invention comprises a hardware processor that: acquires one or more of target images to be processed; selects a preferred service from among the plurality of services for each of the one or more of target images on the basis of a degree at which each attribute satisfies a condition set for each of the plurality of services; and transfers each of the one or more of target images to a provider that provides each preferred service.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a diagram illustrating an example of a target image and an example of an arrangement of sheets in a scanning unit;

FIG. 5 is a diagram illustrating an example of a confirmation screen;

FIG. 6 is a diagram illustrating an example of an all-inclusive confirmation screen;

FIG. 7 is a diagram illustrating an example of an all-inclusive confirmation screen;

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
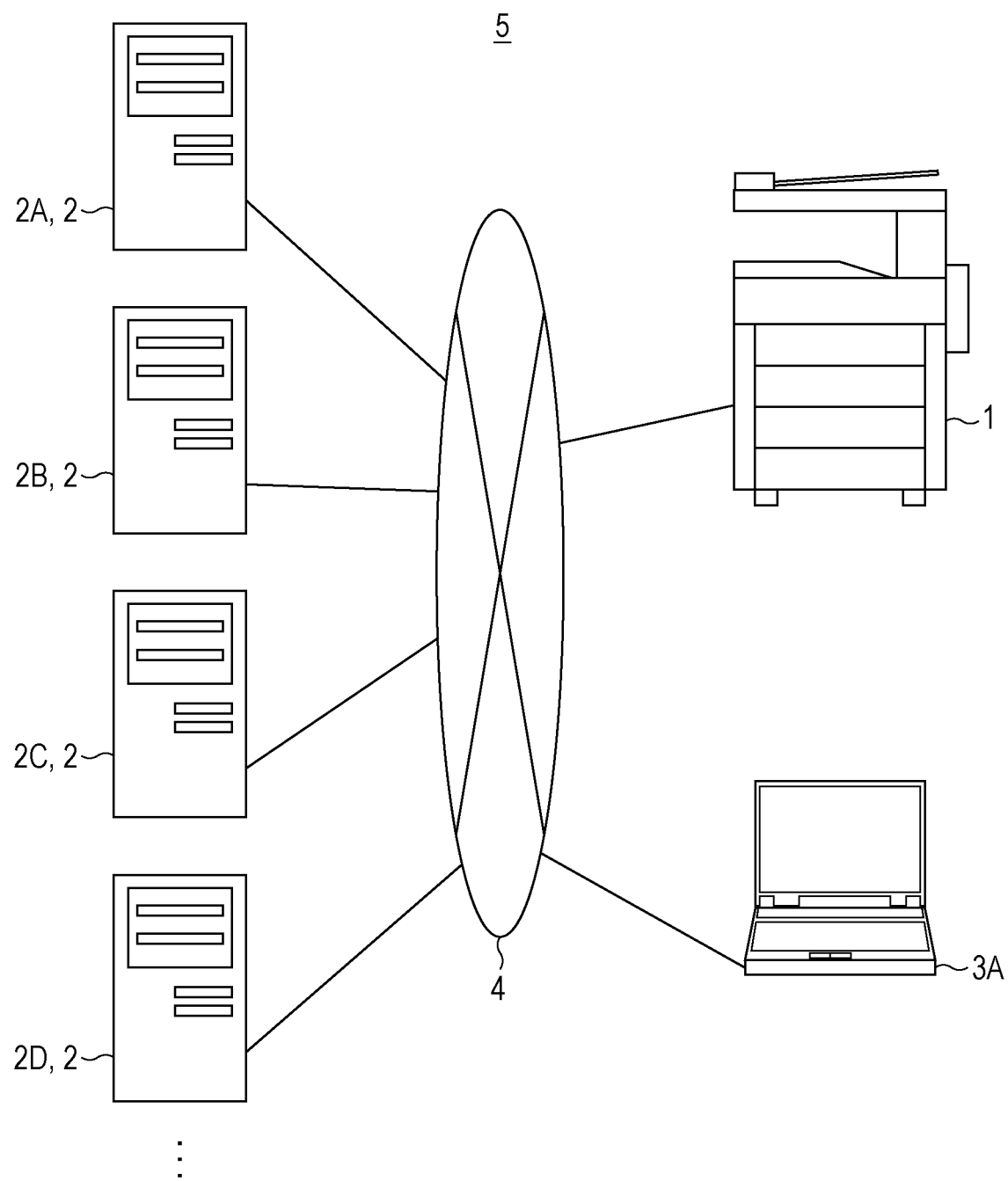
FIG. 1 is a diagram illustrating an example of an overall configuration of a service providing system.
Figure 2:
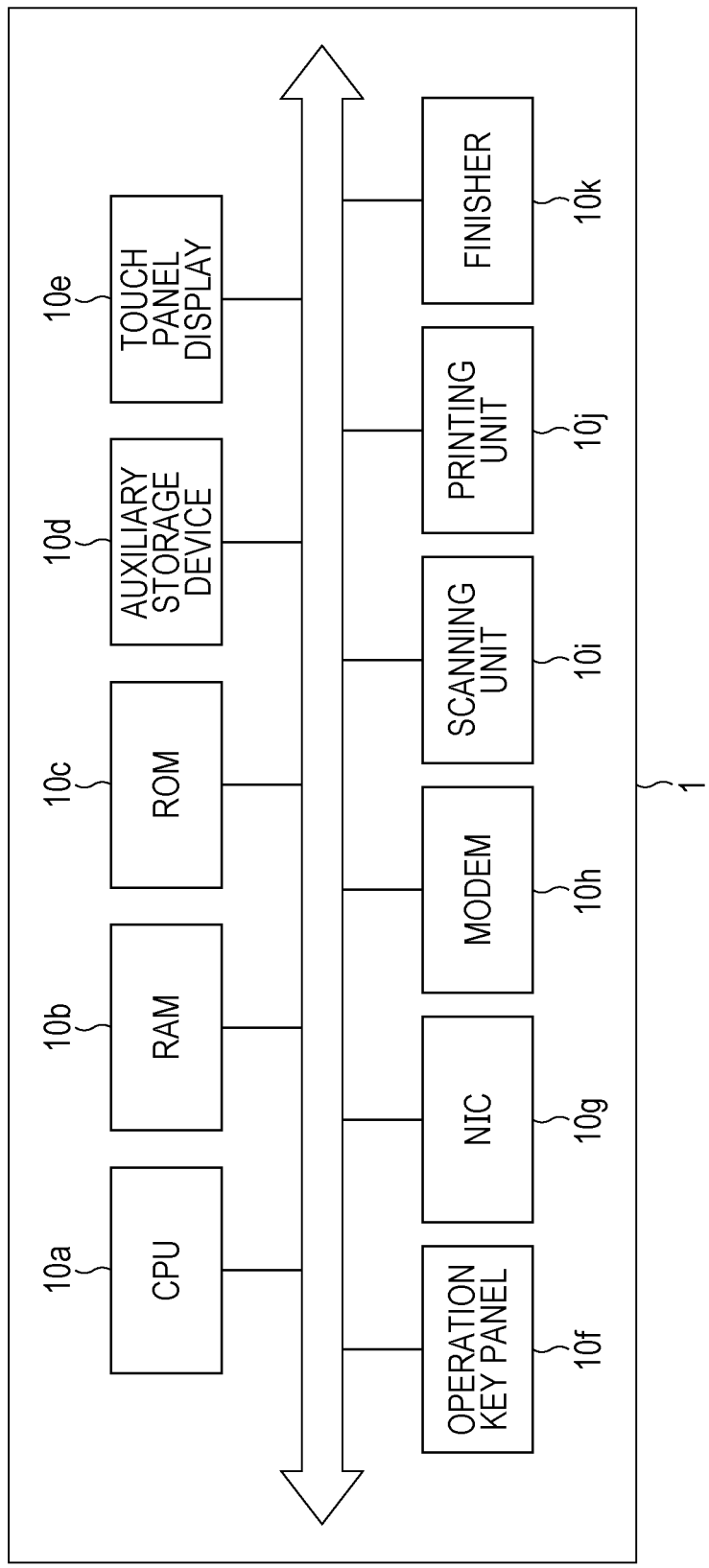
FIG. 2 is a diagram illustrating an example of a hardware configuration of an image forming device.
Figure 3:
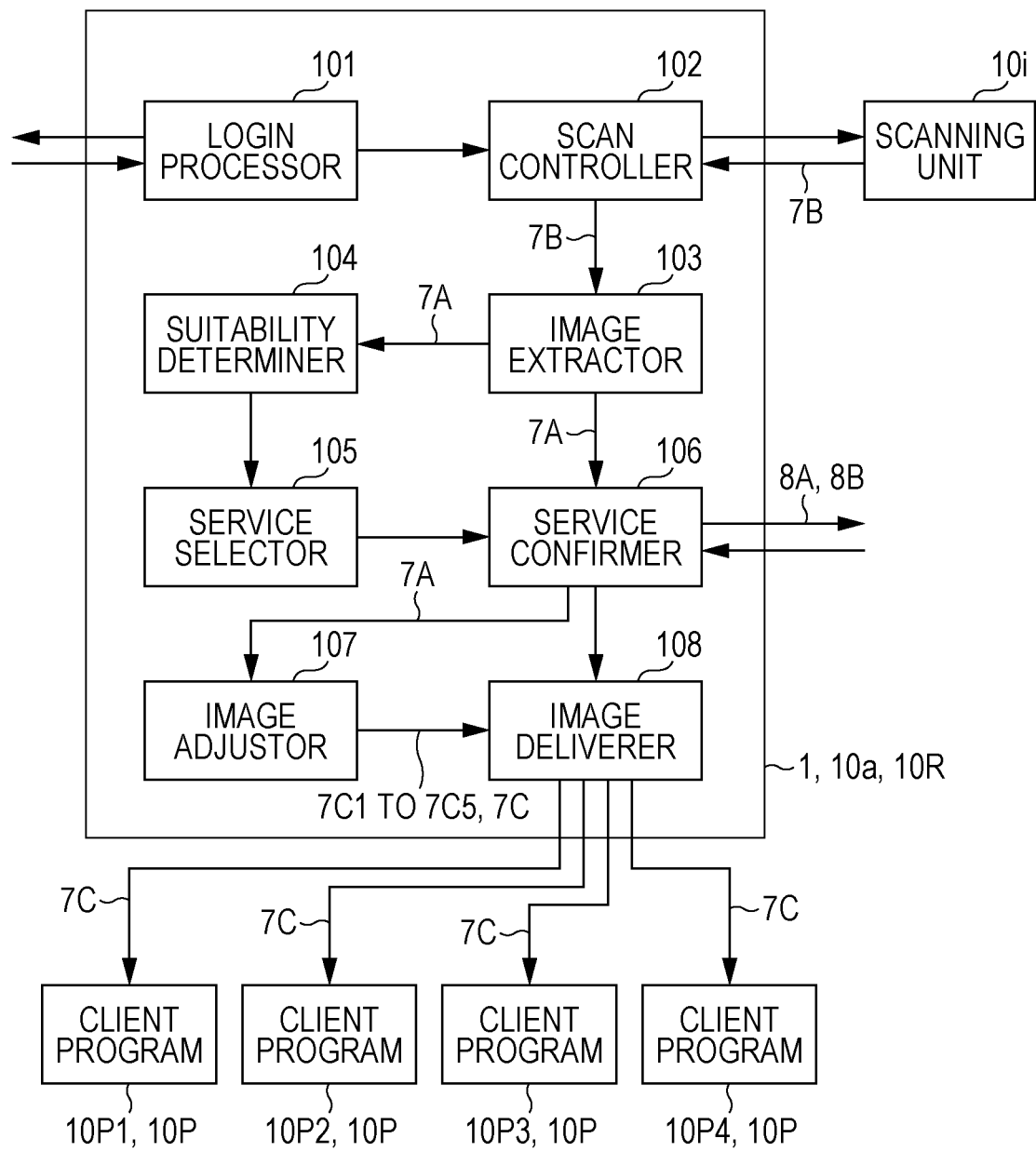
FIG. 3 is a diagram illustrating an example of a hardware configuration of an image forming device.

FIG. 1 is a diagram illustrating an example of an overall configuration of a service providing system 5. FIG. 2 is a diagram illustrating an example of a hardware configuration of an image forming device 1. FIG. 3 is a diagram illustrating an example of a hardware configuration of the image forming device 1.

As illustrated in FIG. 1, the service providing system 5 includes an image forming device 1, a plurality of servers 2, one or more terminal devices 3A, a communication line 4, and the like.

According to the service providing system 5, the user can receive various services. In particular, it is possible to send an image necessary for receiving a service to the service provider more easily than in the related art.

The image forming device 1, the servers 2, and the terminal devices 3A can exchange data with one another via the communication line 4. As the communication line 4, the Internet, a local area network (LAN), a public line, a dedicated line, or the like is used.

The image forming device 1 is a device in which functions such as copying, PC print, facsimile, scanning, and a box are aggregated. In general, it is also referred to as a "multi function peripheral (MFP)".

The PC print function is a function of printing an image on a sheet on the basis of image data received from the terminal device 3A. It is also referred to as "network printing" or "network print".

The box function is a function of assigning a storage region called a "box" or a "personal box" to each user and enabling each user to store and manage image data or the like through his/her own storage region. A box may be set for each group or may be shared by members of a group. The box corresponds to a "folder" or a "directory" in a personal computer.

The server 2 is a server that provides services. As the server 2, the cloud server or the web server is used. The server 2 may be physically one server device or may include a plurality of server devices or the like. Alternatively, a plurality of servers 2 may be logically installed in one server device.

A case in which four services, that is, an expense settlement service, a business card management service, a translation service, and a my number collection service are provided, and one server 2 is installed for each service will be described below as an example. Further, a case in which the image forming device 1 is used in a company having a plurality of employees will be described as an example.

The "expense settlement service" is a service for settling an expense used by an employee. The "business card management service" is a service for managing information described in a business card which an employee received from a business partner. The "translation service" is a service for translating a document written in a certain language into another language. In the present embodiment, according to the translation service, a document written in a language (a translation source language) of any one of Japanese, English, Chinese, German, and French can be translated into a language other than the translation source language of these five languages. The "my number collection service" is a service for collecting personal numbers for social security and taxes of employees, that is, so-called my numbers by a company.

Hereinafter, the servers 2 which provide the expense settlement service, the business card management service, the translation service, and the my number collection service are referred to distinctively as an "expense settlement server 2A", a "business card management server 2B", a "translation server 2C", and a "my number collection server 2D", respectively.

The terminal device 3A is a client who remotely uses the PC print function, the box function, and the like of the image forming device 1. As the terminal device 3A, a personal computer, a tablet computer, a smartphone, or the like is used.

As illustrated in FIG. 2, the image forming device 1 includes a central processing unit (CPU) 10a, a random access memory (RAM) 10b, a read only memory (ROM) 10c, an auxiliary storage device 10d, a touch panel display 10e, an operation key panel 10f, a Network Interface Card (NIC) 10g, a modem 10h, a scanning unit 10i, a printing unit 10j, a finisher 10k, and the like.

The touch panel display 10e displays a screen for indicating a message to the user, a screen in which the user inputs a command or information, a screen for indicating a result of a process executed by the CPU 10a, or the like. Further, the touch panel display 10e transmits a signal indicating a touched position to the CPU 10a.

The operation key panel 10f is a so-called hardware keyboard and is constituted by a numeric keypad, a start key, a stop key, a function key, and the like.

The NIC 10g communicates with the server 2, the terminal device 3A, and the like in accordance with a protocol such as a Transmission Control Protocol/Internet Protocol (TCP/IP).

The modem 10h exchanges image data with a facsimile terminal in accordance with a protocol such as G3.

The scanning unit 10i scans an image on a sheet set on the platen glass and generates image data.

The printing unit 10j prints an image received from another device via the NIC 10g or the modem 10h as well as the image scanned by the scanning unit 10i on the sheet.

The finisher 10k executes post processing on a printed material obtained by the printing unit 10j if necessary. The post-processing includes a process of binding with a staple, a process of cutting a punch hole, a folding process, or the like.

Programs for realizing the functions such as copying and PC print described above are stored in the ROM 10c or the auxiliary storage device 10d.

Further, client programs 10P1, 10P2, 10P3, and 10P4 are stored in the auxiliary storage device 10d as client programs 10P for receiving the expense settlement service, the business card management service, the translation service, and the my number collection service. Further, an image delivery program 10R is stored. The client program 10P is distributed from the service provider.

According to the service image delivery program 10R, a login processor 101, a scan controller 102, an image extractor 103, a suitability determiner 104, a service selector 105, a service confirmer 106, an image adjustor 107, and an image deliverer 108 illustrated in FIG. 3 are realized in the image forming device 1. According to the login processor 101 to the image deliverer 108, a service to be received is decided from among the four services, and a process for uploading an image to the server 2 of the decided service is performed.

These programs are loaded onto the RAM 10b and executed by the CPU 10a. As the auxiliary storage device 10d, a hard disk, a solid state drive (SSD), or the like is used.

FIG. 4 is a diagram illustrating an example of a target image 7A and an example of an arrangement of sheets on the scanning unit 10i. FIG. 5 is a diagram illustrating an example of a confirmation screen 8A. FIG. 6 is a diagram illustrating an example of an all-inclusive confirmation screen 8B. FIG. 7 is a diagram illustrating an example of an all-inclusive confirmation screen 8C.

Processes of the login processor 101 to the image deliverer 108 illustrated in FIG. 3 will be described as a case in which a user 80 who is one employee uses the image forming device 1 as an example.

The login processor 101 executes a process of causing the user 80 to log in the image forming device 1 as follows.

The login processor 101 causes the touch panel display 10e to display a screen for receiving a user code and a password. The user 80 inputs his/her own user code and password by operating the touch panel display 10e or the operation key panel 10f.

In this case, the login processor 101 collates the input user code and password with a user code and a password which are registered in a user account database or the like in advance. Then, when a user code and a password coinciding with the input user code and password are registered, the login processor 101 causes the user 80 to log in the image forming device 1.

The login processor 101 may perform a login process by any other method such as biometric authentication.

After logging in, the user 80 sets a sheet including an image to be transmitted to the service provider on the scanning unit 10i. The sheet may be set on the platen glass of the scanning unit 10i or may be set on an auto document feeder (ADF) of the scanning unit 10i. Hereinafter, this image is referred to as a "target image 7A".

A plurality of sheets may be set together. When the sheets are set on the platen glass, it is desirable to arrange the sheets on the platen glass as illustrated in FIG. 4. When the sheets are set on the ADF, it is desirable to stack the sheets.

Sheets having different image destinations may be included in a plurality of sheets. For example, a sheet in which an image to be transmitted to the provider of the expense settlement service is included as a target image 7A and a sheet in which an image to be transmitted to the provider of the business card management service is included as the target image 7A may be included.

After the sheet is set, the user 80 inputs an instruction to start scanning to the image forming device 1 by performing a predetermined operation (for example, an operation of pressing a start key of the operation key panel 10f).

In this case, the scan controller 102 causes the scanning unit 10i to scan the set sheet and acquires the target image 7A. At this time, the scan controller 102 causes the scanning unit 10i to scan the set sheet with a maximum capability of scanning unit 10i. In other words, the scan controller 102 causes the scanning unit 10i to scan the set sheet at the highest scanning resolution of the scanning unit 10i. In a case in which the scanning unit 10i is a color scanner, the scan controller 102 causes the scanning unit 10i to scan the set sheet in color. Alternatively, the scan controller 102 causes the scanning unit 10i to scan the set sheet with a predetermined capability or more.

Here, in a case in which a plurality of sheets are set on the platen glass, a plurality of target images 7A are included in one image obtained by the scanning unit 10i (hereinafter referred to as a "scanned image 7B").

In this regard, the image extractor 103 extracts each of the target images 7A from the scanned image 7B. As an extracting method, a known method such as edge detection is used.

As a result of performing the process through the image extractor 103, in the example illustrated in FIG. 4, five target images 7A are extracted. Hereinafter, the respective target images 7A are referred to distinctively as a "target image 7A1", a "target image 7A2", . . . , a "target image 7A5".

In a case in which a plurality of sheets are stacked and set in the ADF, the target image 7A is independently scanned by the scanning unit 10i one by one. Therefore, the process by the image extractor 103 can be omitted, and one scanned image 7B can be used as one target image 7A without change. Here, in a case in which there is an extra blank space at an upper edge, a lower edge, a left edge, or a right edge of the scanned image 7B, the image extractor 103 may extract the target image 7A so that the extra blank space is removed.

The suitability determiner 104 determines whether or not it is desirable to apply each of the above-described four services to each of the target images 7A. Further, before the determination, the suitability determiner 104 executes an optical character recognition (OCR) process on each of the target images 7A and generates text data of a character string included in the target image 7A.

The suitability determiner 104 determines whether or not it is desirable to apply the expense settlement service to a certain target image 7A, for example, as follows.

The suitability determiner 104 searches for a character string indicating an amount of money from the target image 7A. Such a character string is a character string including a predetermined format such as "¥N", "N yen", or "$N". "N" is a number, but there are cases in which "," (comma) is included.

If such a character string is not found, the suitability determiner 104 determines that it is not desirable to apply the expense settlement service to the target image 7A. If such a character string is found, it is further checked whether or not the target image 7A satisfies the following conditions (1-1) to (1-3):

(1-1) a character string indicating a receipt is included;
(1-2) a character string indicating a date is included; and
(1-3) a character string indicating a transactional counterparty is included.

Examples of the character string of (1-1) include character strings such as "領収書", "レシート", "受領 書", "お買いあげ票", and "Receipt".

The character string of (1-2) is a character string including a predetermined format. For example, the character string includes a format such as "A year B month C date" or "A/B/C". "A" is a 2-digit or 4-digit number. "B" is a character string indicating a month such as one of "1" to "12" or "Jan", "Feb", . . . , "Dec". "C" is any one of "1" to "31".

The character string of (1-3) includes a character string indicating a title such as ""御中"", "殿", or "様".

Then, the suitability determiner 104 determines that it is desirable to apply the expense settlement service when the number of satisfying conditions among the three conditions is a predetermined number Th1 or more. When not satisfied, it is determined that it is not desirable.

The suitability determiner 104 determines whether or not it is desirable to apply the business card management service to a certain target image 7A, for example, as follows.

The suitability determiner 104 checks whether or not the target image 7A satisfies the following conditions (2-1) to (2-7):

(2-1) a character string indicating a company name is included;

(2-2) a character string indicating a name is included;

(2-3) a character string indicating an address is included;

(2-4) a character string indicating a telephone number is included;

(2-5) a character string indicating an e-mail address is included;

(2-6) a face picture is included; and (2-7) a size of the target image 7A is equal to a regular size of a business card. Alternatively, a difference from the standard size of the business card is within a predetermined range (for example, within 3 mm each in length and width).

The character string of (2-1) includes a specific character string such as "Co., Ltd." or "limited company".

The character string of (2-2) is, for example, a combination of kanji and Roman characters made in a column setting (two-column notation).

The character string of (2-3) is a character string including a postal code and one of "city", "ward", "town", and "village".

The character string of (2-4) is a character string including a predetermined format such as "D-E-F". "D" is a 2- to 4-digit number starting from "0". "E" is a 2- to 4-digit number starting from any one of "2" to "9". "F" is a 4-digit number.

The character string of (2-5) is a character string including "@", ".", and alphabet letters.

It is possible to determine whether or not (2-6) is satisfied by a known method of detecting a face of a person from a photograph.

Then, the suitability determiner 104 determines that it is desirable to apply the business card management service in a case in which the number of satisfying conditions among the seven conditions is a predetermined number Th2 or more. When not satisfied, it is determined that it is not desirable.

The suitability determiner 104 determines whether or not it is desirable to apply the translation service to a certain target image 7A, for example, as follows.

The suitability determiner 104 checks whether or not the target image 7A satisfies the following conditions (3-1) to (3-3):

(3-1) a language describing a specific screen displayed on the touch panel display 10e when the user 80 is using the image forming device 1 is different from a language describing a document shown in the target image 7A;

(3-2) a language describing a document shown in the target image 7A is included in a language of a translation source to which the translation service corresponds; and (3-3) a language describing a document shown in the target image 7A is different from a language which the user 80 normally uses.

The specific screen of (3-1) is a so-called home screen which is displayed when a reset key is pressed or immediately after the user logs in. Alternatively, the specific screen of (3-1) is a setting screen. Each screen is prepared for each language such as Japanese, English, Chinese, or the like, and a language of a screen to be displayed is set for each user in an operating system of the image forming device 1. Therefore, the language described in (3-1) can be known by checking with the operating system.

The language describing the document in (3-1) to (3-3) can be known by analyzing the document by a known method.

The language of the translation source of (3-2) can be known by checking with the client program 10P3 or the translation server 2C. Alternatively, it may be registered in a database or the like in advance.

The language normally used by the user 80 in (3-3) can be known on the basis of the information of a user account of the user 80.

Then, the suitability determiner 104 determines that it is desirable to apply the translation service when the number of satisfying conditions among the three conditions is a predetermined number Th3 or more. When not satisfied, it is determined that it is not desirable.

The suitability determiner 104 determines whether or not it is desirable to apply the my number collection service to a certain target image 7A, for example, as follows.

The suitability determiner 104 checks whether or not the following condition (4-1) or (4-2) is satisfied:

(4-1) the target image 7A is an image of a specific identification card;

(4-2) a number having the same number of digits as the number of the my number, that is, a 12-digit number is included in any target image 7A other than the target image 7A.

The identification card of (4-1) is, for example, a driver license, a passport, or a driving history certificate. It is possible to determine whether or not the target image 7A is one of these images by a known method. The same applies to (4-3) to be described later.

Then, the suitability determiner 104 determines that it is desirable to apply the business card management service when both of the two conditions are satisfied. Otherwise, it is checked whether or not the following condition (4-3) or (4-4) is satisfied:

(4-3) a number having the same number of digits as the number of the my number, that is, a 12-digit number is included in the target image 7A;

(4-4) any target image 7A other than the target image 7A is an image of a specific identification card.

Then, the suitability determiner 104 determines that it is desirable to apply the business card management service when both of the two conditions are satisfied. Otherwise, it is determined that it is not desirable.

The service selector 105 selects the service to be applied to each target image 7A as follows. Hereinafter, the service to be applied is described as an "application service".

If it is desirable to be applied to the target image 7A, in a case in which only one service determined by the suitability determiner 104 is selected, that one service is selected as the application service of the target image 7A. For example, in a case in which the service determined to be desirable to be applied to the target image 7A1 is only the business card management service, the business card management service is selected as the application service of the target image 7A1.

On the other hand, when there are a plurality of services determined to be desirable to be applied, the service selector 105 selects one of these services as the application service of the target image 7A, for example, as follows.

The service selector 105 selects a service in which the proportion of the satisfied conditions among these services is highest as the application service of the target image 7A. For example, in a case in which services which are desirable to be applied are two services, that is, the business card management service and the translation service, the proportion of the satisfied conditions among the seven conditions (2-1) to (2-7) and the proportion of the satisfied conditions among the three conditions (3-1) to (3-3) are calculated. Then, a service with the highest percentage out of the two services is selected as the application service of the target image 7A.

Alternatively, the number of uses of each service is recorded as a history for each user. For example, the number of target images 7A to which each service is applied is recorded as the number of uses. Alternatively, for each service, the number of activations of the client program 10P corresponding to each service may be recorded as the number of uses. Then, the service selector 105 selects the service having the largest number of uses by the user 80 among a plurality of services determined by the suitability determiner 104 as the application service of the target image 7A.

In a case in which it is unable to be selected by the above-described method, the service selector 105 may select a predetermined service with the highest priority.

The service confirmer 106 executes a process for causing the user 80 to confirm whether or not the service selected by the service selector 105 is applied, for example, as follows.

For each target image 7A, the service confirmer 106 causes the touch panel display 10e to display the confirmation screen 8A for urging confirmation of whether or not the selected service is applied. For example, in a case in which the expense settlement service is selected as the application service of a target image 7A3, a screen as illustrated in FIG. 5 in which the target image 7A3 is arranged is displayed as the confirmation screen 8A.

The user 80 confirms whether or not it is applied by seeing the confirmation screen 8A. Then, when it is applied, the user 80 taps an apply button 8A1. When it is not applied, the user 80 taps a cancel button 8A2.

When the apply button 8A1 is tapped, the service confirmer 106 decides that the selected service is applied to the target image 7A. The application is stopped when the cancel button 8A2 is tapped. In the example of FIG. 5, when the apply button 8A1 is tapped, it is decided that the expense settlement service is applied to the target image 7A3. The application is stopped when the cancel button 8A2 is tapped.

The service confirmer 106 may cause the confirmation screen 8A to be displayed for each target image 7A as described above, but the service confirmer 106 may cause whether or not it is applied to a plurality of target images 7A to be confirmed together as follows.

The service confirmer 106 groups the target images 7A for each application service. For example, in a case in which the application service of the target images 7A1, 7A2, and 7A4 is the business card management service, and the application service of the target images 7A3 and 7A5 is the expense settlement service, the target images 7A1, 7A2, and 7A4 are grouped into a business card management service group, and the target image 7A3 and 7A5 are grouped into an expense settlement service group.

Then, the service confirmer 106 causes the touch panel display 10e to display an all-inclusive confirmation screen 8B for urging confirmation of whether or not the selected service is applied for each group. For example, in order to urge the confirmation for the business card management service group, a screen illustrated in FIG. 6 in which the target images 7A belonging to that group, that is, 7A1, 7A2, and 7A4 are arranged is displayed as the all-inclusive confirmation screen 8B.

The user 80 confirms whether or not it is applied by seeing the all-inclusive confirmation screen 8B. Then, when it is applied, the user 80 taps an apply button 8B1. In a case in which the target image 7A which is undesired to be applied is included, the user 80 taps and selects the target image 7A and then taps the apply button 8B1.

When the apply button 8A1 is tapped, the service confirmer 106 decides that the selected service is applied to the target image 7A which is not tapped among the target images 7A shown on the all-inclusive confirmation screen 8B, and stops the application to the tapped target image 7A. In the example of FIG. 6, when the apply button 8B1 is tapped after only the target image 7A2 among the target images 7A1, 7A2, and 7A4 is touched, it is decided that the business card management service is applied to the target images 7A1 and 7A4, and the application of the business card management service to the target image 7A2 is stopped. Further, when a cancel button 8B2 is tapped, the application of the business card management service to all the target images 7A1, 7A2, and 7A4 is stopped.

Alternatively, the service confirmer 106 may cause the all-inclusive confirmation screen 8C illustrated in FIG. 7 to be displayed instead of the all-inclusive confirmation screen 8B. Similarly to the all-inclusive confirmation screen 8B, all the target images 7A belonging to the group are arranged on the all-inclusive confirmation screen 8C. The usage of the all-inclusive confirmation screen 8C is similar to the usage of all-inclusive confirmation screen 8B which has been described above.

However, in the all-inclusive confirmation screen 8C, a thumbnail region 8C1 and a service button 8C2 of each service are further arranged.

When the target image 7A to which the service of the group does is undesired to be applied from the all-inclusive confirmation screen 8C is found, the user 80 drags and drops the target image 7A to the thumbnail region 8C1.

Then, the service confirmer 106 stops the application of the service to the target image 7A.

Alternatively, the user 80 drags and drops the target image 7A to the service button 8C2 corresponding to the group which is desired to be applied.

Then, the service confirmer 106 decides the application service of the target image 7A as the service corresponding to the service button 8C2 to which it is dragged and dropped. For example, when the target image 7A2 is dragged and dropped to a service button 8C23, the application service of the target image 7A2 is decided as the translation service.

With the above processes, the application service of each target image 7A is decided. A case in which the application service is decided for each of the target images 7A1 to 7A5 will be described below as an example.

The image adjustor 107 performs a process corresponding to the decided application service for each of the target images 7A1 to 7A5.

For example, in a case in which a portable network graphics (PNG) file is requested in the expense settlement service, and the decided application service of the target images 7A3 and 7A5 is the expense settlement service, the image adjustor 107 performs a process of converting the image data of each of the target images 7A3 and 7A5 into a PNG file. In addition, a process such as resolution adjustment, conversion from color image into monochrome image, edge emphasis, or top/bottom correction is performed depending on a service.

Hereinafter, the target image 7A which has undergone the process corresponding to the application service is referred to as an "adjusted image 7C". Similarly, the target images 7A1, 7A2, and the like which have undergone the process corresponding to the application service are referred to as an "adjusted image 7C1", an "adjusted image 7C2", and the like.

The image deliverer 108 transfers a file of each of the adjusted images 7C1 to 7C5 to the client program 10P of each decided application service and makes a request to apply the service. Further, in a case in which the client program 10P is not activated yet, the client program 10P is activated.

For example, in a case in which the decided application service of the adjusted images 7C3 and 7C5 is the expense settlement service, a file of each of the adjusted images 7C3 and 7C5 is transferred to the client program 10P1.

A process for applying the service is executed on the transferred file by the client program 10P or the server 2. For example, the client program 10P1 uploads the file of each of the adjusted images 7C3 and 7C5 to the expense settlement server 2A. Then, the expense settlement server 2A performs a process for settling expenses used by the user 80 on the basis of the adjusted images 7C3 and 7C5.

Figure 8:
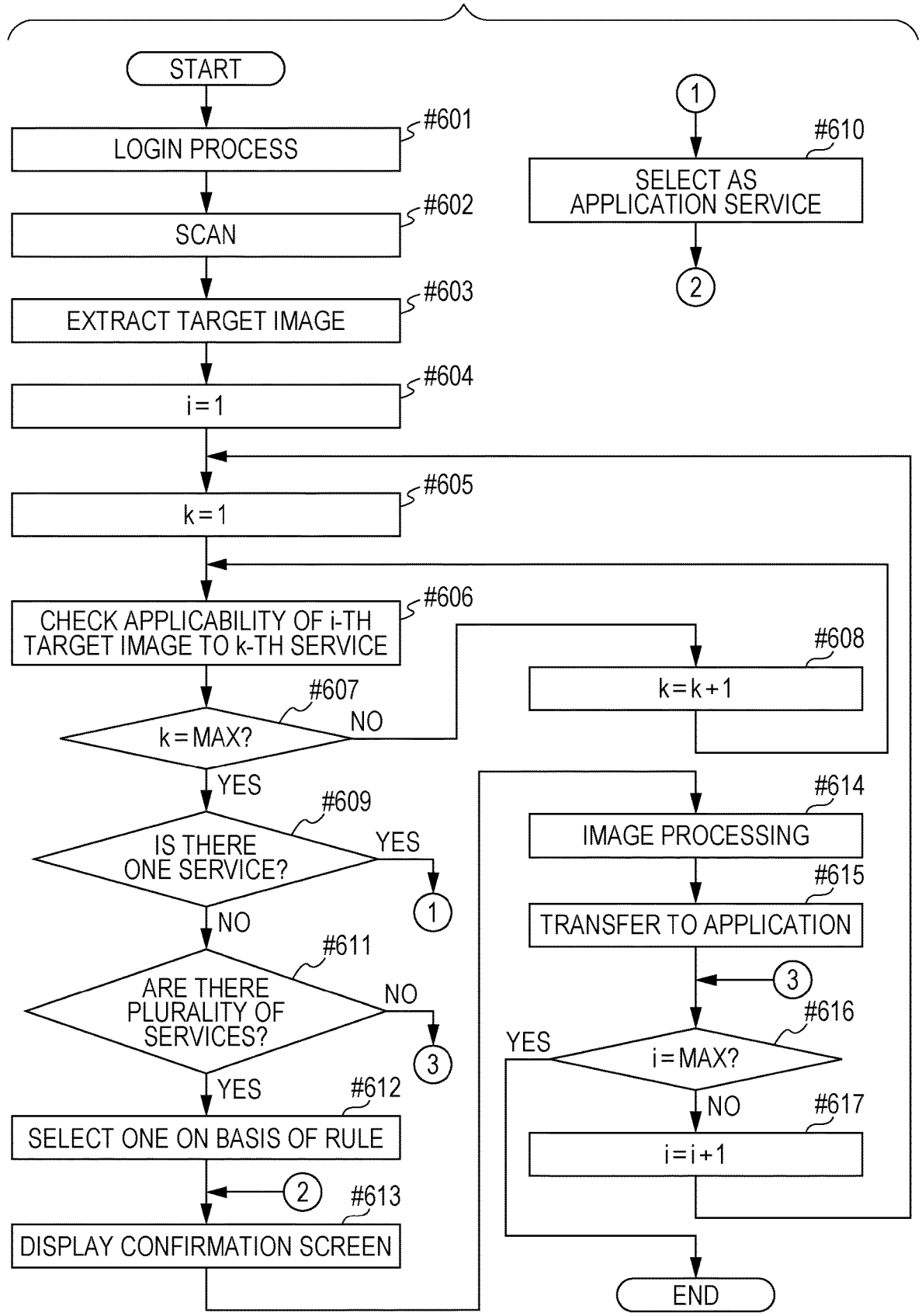
FIG. 8 is a flowchart illustrating an example of a flow of an overall process of an image forming device.
Figure 9:
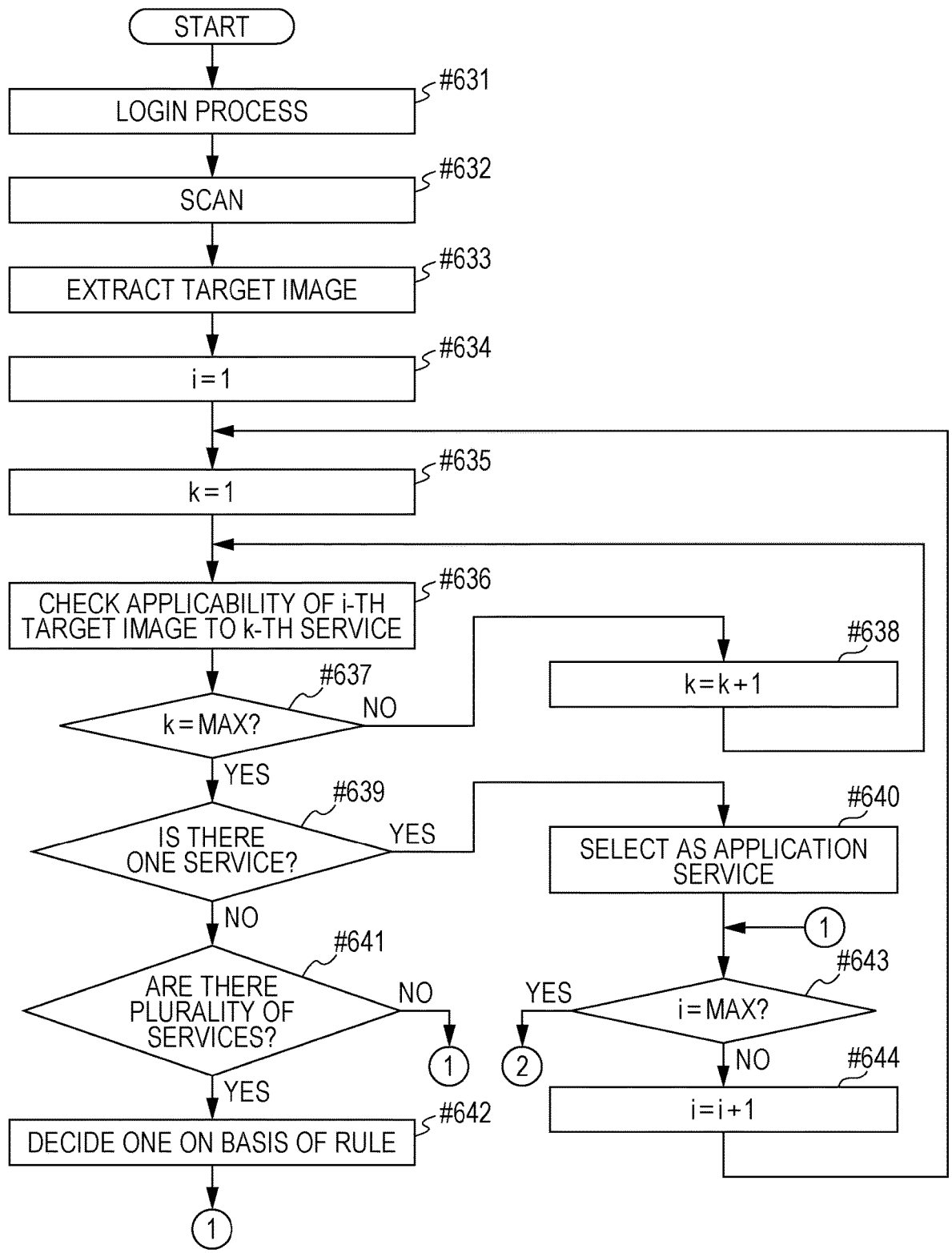
FIG. 9 is a flowchart illustrating a modified example of the flow of the overall process of the image forming device.
Figure 10:
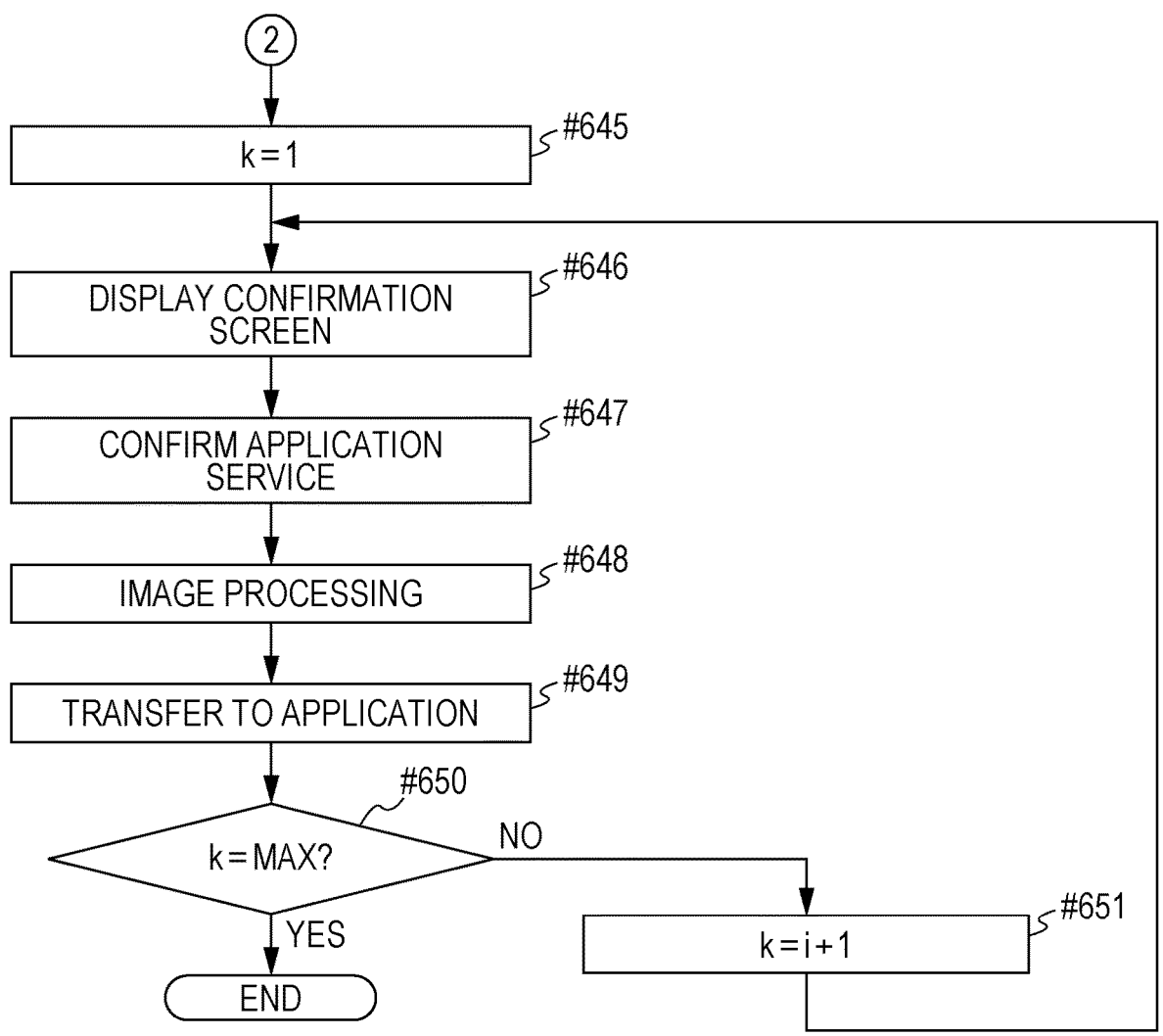
FIG. 10 is a flowchart illustrating a modified example of the flow of the overall process of the image forming device.

FIG. 8 is a flowchart illustrating an example of a flow of an overall process of the image forming device 1. FIGS. 9 to 10 are flowcharts illustrating modified examples of a flow of an overall process of the image forming device 1.

Next, a flow of an overall process for transferring an image to the client program 10P to receive one of the expense settlement service, the business card management service, the translation service, and the my number collection service will be described with reference to flowcharts using a case in which the user 80 uses the image forming device 1 as an example.

The image forming device 1 executes a process with a procedure illustrated in FIG. 8 on the basis of the image delivery program 10R when the user is caused to confirm the application service for each target image 7A.

The image forming device 1 performs a process for causing the user 80 to log in the image forming device 1 (#601 of FIG. 8). After the user 80 logs in, an image is scanned from a sheet set on the scanning unit 10i (#602), and the target image 7A is extracted (#603).

The image forming device 1 focuses on a first target image 7A (#604). It is determined whether or not it is desirable to apply a first service to the focused target image 7A (#605 and #606). Further, it is determined whether or not it is desirable to apply second to fourth services to the extracted target image 7A (No in #607, #608, and #606).

Upon completion of the determination (Yes in #607), the image forming device 1 selects the application service as follows.

In a case in which there is only one service which is desirable to be applied to the focused target image 7A (Yes in #609), the image forming device 1 selects that one service as the application service (#610). On the other hand, in a case in which there are two or more services which are desirable to be applied to the focused target image 7A (No in #609 and Yes in #611), one of these services is selected on the basis of the percentage of the satisfied conditions, the number of previous uses, or the like (#612).

Then, the image forming device 1 urges by displaying the confirmation screen 8A (see FIG. 5) so that it is confirmed whether or not the selected application service is applied to the focused target image 7A (#613). The user 80 taps the apply button 8A1 when the selected application service is applied. Accordingly, the application service of the focused target image 7A is decided as the selected application service. When it is undesired to be applied, the user 80 taps the cancel button 8A2. When the cancel button 8A2 is tapped, the image forming device 1 may display a list of services and cause the user to select the application service. At this time, a degree of satisfaction of the condition may be displayed together with the service. Then, the application service of the focused target image 7A may be decided as the selected application service.

The image forming device 1 executes the process corresponding to the decided application service to the focused target image 7A (#614). Accordingly, the file of the adjusted image 7C is obtained. Then, the file of the adjusted image 7C is transferred to the client program 10P of the decided application service (#615).

The image forming device 1 similarly focuses on the second and subsequent target images 7A (No in #616 and #617) and executes the processes of steps #605 to #615.

Further, after the application services of all the target image 7A are decided, the image forming device 1 may collectively perform the processes of steps #614 to #615 on all the target images 7A.

If there is no service which is desirable to be applied (No in #611), the image forming device 1 may skip the process of step #614 to #615. Alternatively, a list of services may be displayed, and the user may be caused to select the application service. Then, the selected application service may be decided, and the process of step #614 to #615 may be executed.

Alternatively, in order to cause the user to collectively confirm the application service to a plurality of target images 7A, the image forming device 1 executes a process with procedures illustrated in FIGS. 9 to 10 on the basis of the image delivery program 10R.

Similarly to the case of causing the user to confirm the application service for each target image 7A, the image forming device 1 executes the login process (#631 of FIG. 9), scans the sheet (#632), extracts the target image 7A (#633), and selects one application service for each extracted target image 7A (#634 to #644). Here, the user 80 is not requested to confirm each extracted target image 7A. Instead, the image forming device 1 performs a process as follows.

The image forming device 1 presents the selected target images 7A as a group to which the first service is applied by displaying the all-inclusive confirmation screen 8B (see FIG. 6) or the all-inclusive confirmation screen 8C (see FIG. 7) (#645 and #646 of FIG. 10). Then, the application group of each of the target images 7A is decided on the basis of an operation on the all-inclusive confirmation screen 8B or the all-inclusive confirmation screen 8C (#647), and the process corresponding to the decided application service is performed for each target image 7A (#648). Accordingly, the file of the adjusted image 7C is obtained from each target image 7A. Then, the file of the adjusted image 7C is transferred to the client program 10P of the decided application service (#649).

The image forming device 1 similarly performs the process of step #646 to #649 on the second and subsequent services.

According to the first embodiment, in order to receive the service, it is possible to more easily transfer the target image 7A to the service provider server 2.

Second Embodiment

Figure 11:
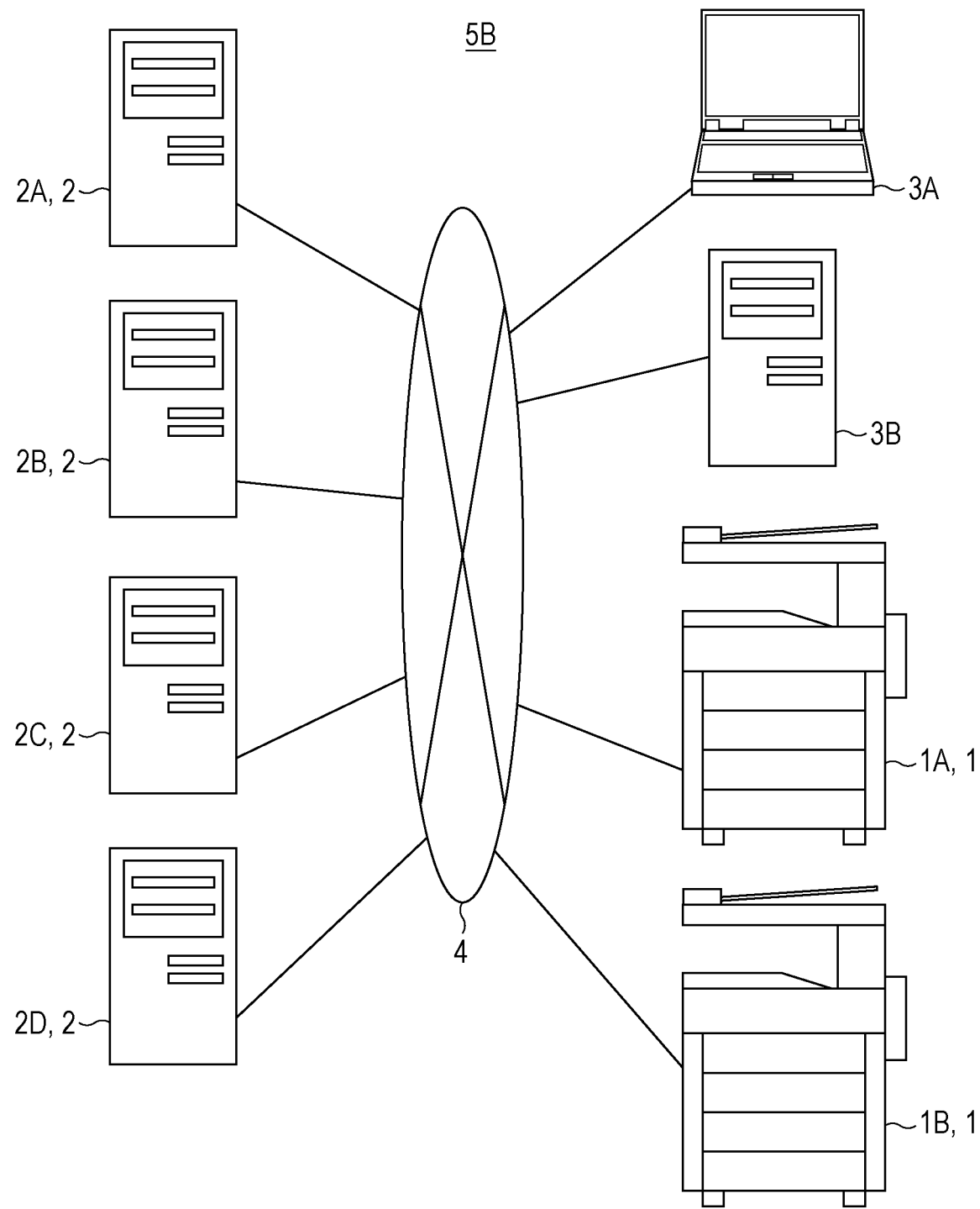
FIG. 11 is a diagram illustrating an example of an overall configuration of a service providing system.
Figure 12:
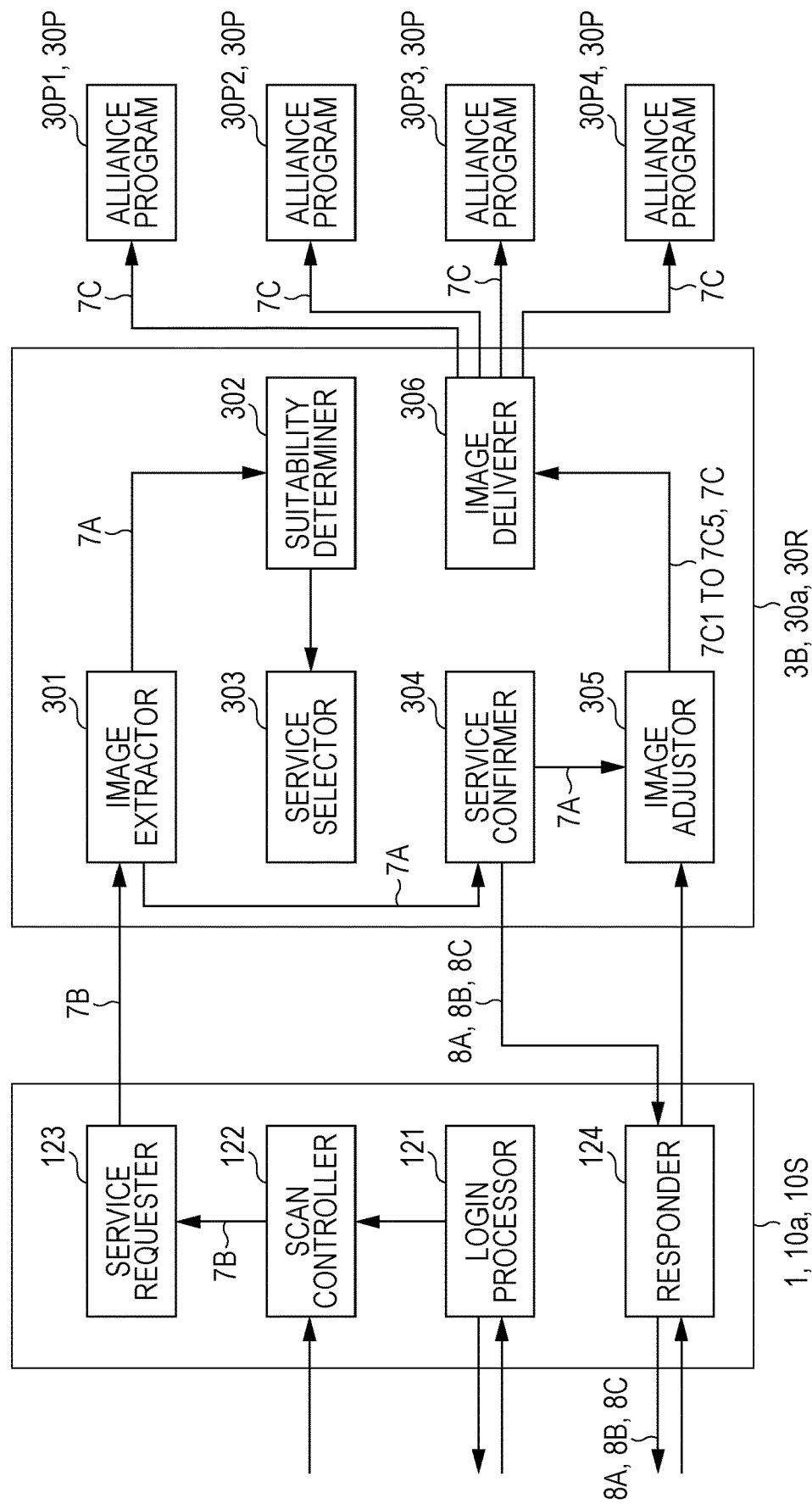
FIG. 12 is a diagram illustrating an example of functional configurations of an image forming device and a support server.
Figure 13:
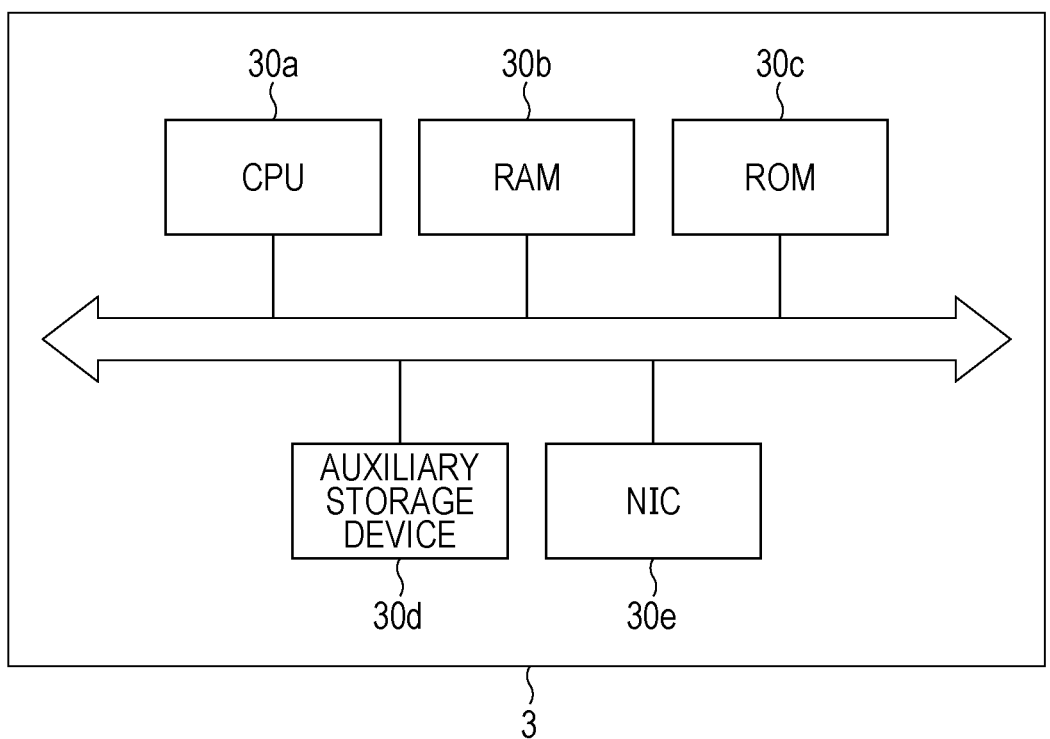
FIG. 13 is a diagram illustrating an example of a hardware configuration of a support server.

FIG. 11 is a diagram illustrating an example of an overall configuration of a service providing system 5B. FIG. 12 is a diagram illustrating an example of functional configurations of an image forming device 1 and a support server 3B. FIG. 13 is a diagram illustrating an example of the hardware configuration of the support server 3B.

In the first embodiment, the image forming device 1 decides the service to be applied to the target image 7A. However, in a second embodiment, the support server 3B decides it.

As illustrated in FIG. 11, the service providing system 5B includes a support server 3B, a plurality of image forming devices 1, a plurality of servers 2, one or more terminal devices 3A, a communication line 4, and the like.

A hardware configuration of the image forming device 1 is similar to that of the first embodiment illustrated in FIG. 2. Here, a service request program 10S of the image delivery program 10R (see FIG. 3) is installed.

According to the service request program 10S, a login processor 121, a scan controller 122, a service requester 123, a responder 124, and the like illustrated in FIG. 12 are implemented in the image forming device 1.

Hereinafter, the respective image forming devices 1 are referred to distinctively as an "image forming device 1A", an "image forming device 1B", and the like.

As illustrated in FIG. 13, the support server 3B includes a CPU 30a, a RAM 30b, a ROM 30c, an auxiliary storage device 30d, an NIC 30e, and the like.

The NIC 30e communicates with the image forming device 1, the server 2, or the like in accordance with a protocol such as TCP/IP.

Alliance programs 30P1 to 30P4 are stored in the ROM 30c or the auxiliary storage device 30d as an alliance program 30P for allying the server 2 with each image forming device 1. The alliance programs 30P1, 30P2, 30P3, and 30P4 are programs for allying the respective image forming device 1 with the expense settlement server 2A, the business card management server 2B, the translation server 2C, and the my number collection server 2D. The alliance program 30P is distributed from the service provider.

Further, a service intermediate program 30R is stored in the ROM 30c or the auxiliary storage device 30d. According to the service intermediate program 30R, an image extractor 301, a suitability determiner 302, a service selector 303, a service confirmer 304, an image adjustor 305, and an image deliverer 306 illustrated in FIG. 12 are realized in the support server 3B.

These programs are loaded onto the RAM 30b and executed by the CPU 30a. A hard disk or an SSD is used as the auxiliary storage device 30d. A cloud server may be used as the support server 3B.

Processes of the respective components of the image forming device 1 and the respective components of the support server 3B illustrated in FIG. 12 will be described below.

In the image forming device 1, the login processor 121 and the scan controller 122 perform processes similar to those of the login processor 101 and the scan controller 102 (see FIG. 3) of the first embodiment.

The service requester 123 requests the support server 3B to apply the service by transmitting one or more scanned images 7B obtained by the scan controller 122 to the support server 3B.

In the support server 3B, when the scanned image 7B is received, the image extractor 301 extracts the target image 7A from the scanned image 7B by a known method, similarly to the image extractor 103. A plurality of target images 7A may be extracted from one scanned image 7B.

Similarly to the suitability determiner 104, the suitability determiner 302 determines whether or not it is desirable to apply each of the above-described four services to each target image 7A.

Similarly to the service selector 105, the service selector 303 selects one application service for each target image 7A.

The service confirmer 304 performs a process for causing the user 80 to confirm whether or not the service selected by the service selector 303 is applied. A method of this process is basically similar to the process by the service confirmer 106, and is performed by causing the touch panel display 10e to display the confirmation screen 8A (see FIG. 5), the all-inclusive confirmation screen 8B (see FIG. 6), or the all-inclusive confirmation screen 8C (see FIG. 7). Here, in order to cause it to be displayed, screen data of the confirmation screen 8A, the all-inclusive confirmation screen 8B, or the all-inclusive confirmation screen 8C is transmitted to the image forming device 1 which is the transmission source of the scanned image 7B.

In the image forming device 1, when the screen data is received from the support server 3B, the responder 124 causes the touch panel display 10e to display the confirmation screen 8A, the all-inclusive confirmation screen 8B, or the all-inclusive confirmation screen 8C on the basis of the screen data.

Here, similarly to the case of the first embodiment, the user confirms the application service and changes the application service as appropriate.

Then, the responder 124 transmits response data 61 indicating content of an operation performed on the confirmation screen 8A, the all-inclusive confirmation screen 8B, or the all-inclusive confirmation screen 8C to the support server 3B.

Then, in the support server 3B, the service confirmer 304 decides the application service for each target image 7A on the basis of the response data 61, similarly to the service confirmer 106.

Similarly to the image adjustor 107, the image adjustor 305 executes a process corresponding to the decided application service to each target image 7A. Accordingly, the adjusted image 7C is generated for each target image 7A.

The image deliverer 306 transfers a file of each adjusted image 7C to the alliance program 30P of each decided application service and makes a request to apply the service. Further, in a case in which the alliance program 30P is not activated yet, the alliance program 30P is activated.

A process for applying the service is executed on the transferred file by the alliance program 30P or the server 2. For example, the alliance program 30P1 uploads the file of each of the adjusted images 7C3 and 7C5 to the expense settlement server 2A. Then, the expense settlement server 2A performs a process for settling expenses used by the user 80 on the basis of the adjusted images 7C3 and 7C5.

When the process for applying the service to all the target images 7A is completed, the image deliverer 306 gives a notification indicating that the process is completed to the transmission source of the scanned image 7B.

Figure 14:
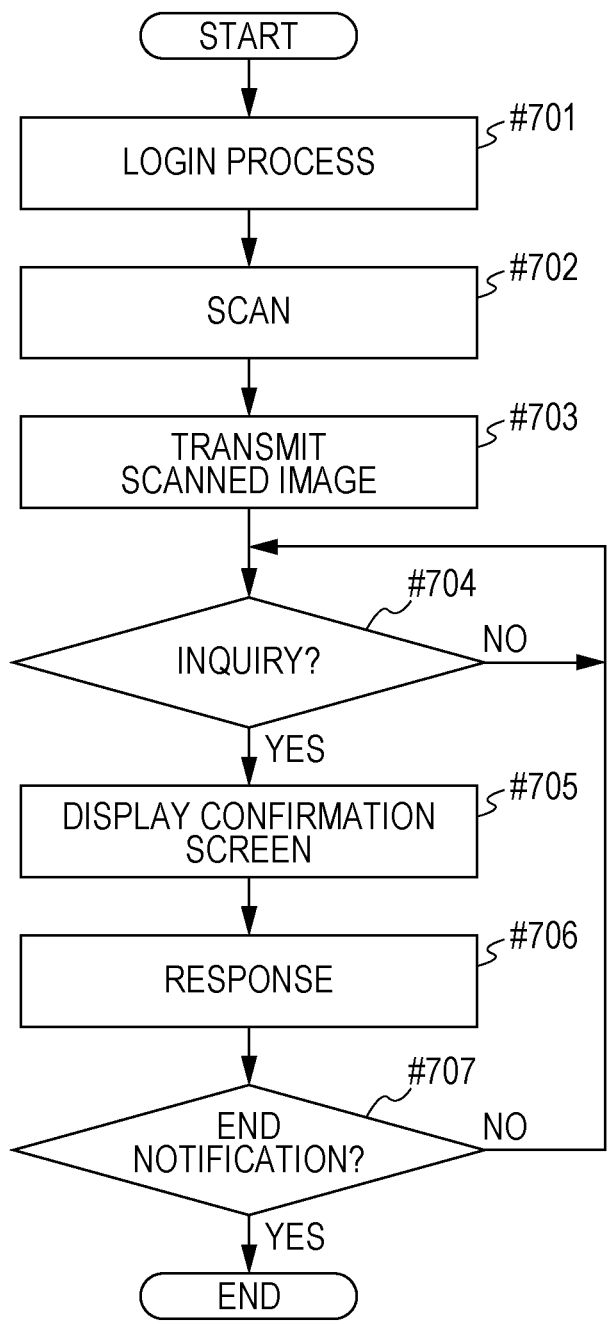
FIG. 14 is a flowchart illustrating an example of a flow of an overall process of an image forming device.
Figure 15:
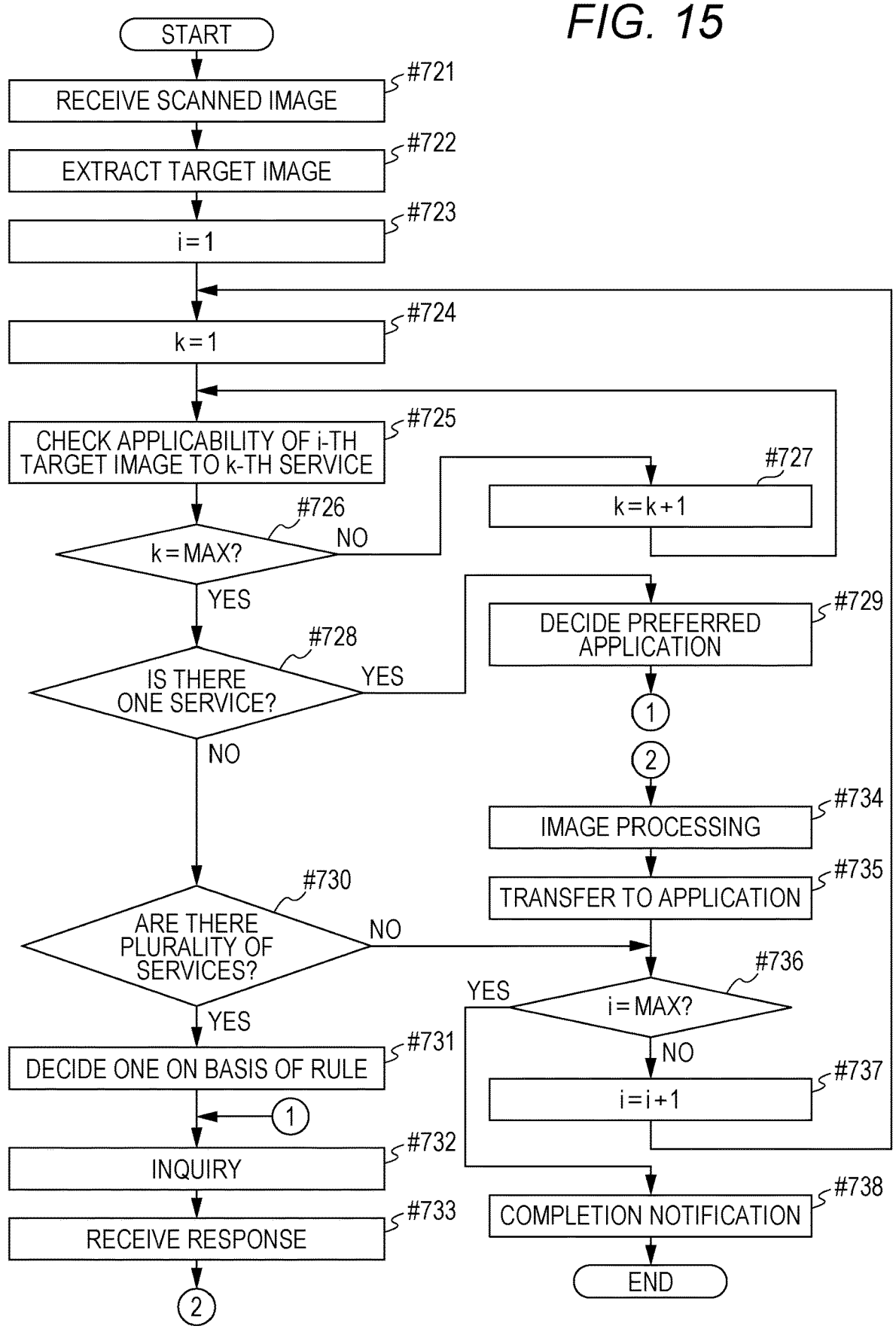
FIG. 15 is a flowchart illustrating an example of a flow of an overall process of a support server.

FIG. 14 is a flowchart illustrating an example of a flow of an overall process of the image forming device 1. FIG. 15 is a flowchart for describing an example of a flow of an overall process of the support server 3B.

Next, an example of flows of overall processes of the image forming device 1 and support server 3B will be described with reference to the flowcharts.

The image forming device 1 executes a process with a procedure illustrated in FIG. 14 on the basis of the service request program 10S. The support server 3B executes a process with a procedure illustrated in FIG. 15 on the basis of the service intermediate program 30R. The flow of the process of the image forming device 1 will be described below using a case in which the image forming device 1A executes the service request program 10S as an example.

The image forming device 1A performs a process for causing the user 80 to log in the image forming device 1A (#701 of FIG. 14). After the user 80 logs in, an image is scanned from a sheet set on the scanning unit 10i (#702), and the scanned image 7B is transmitted to the support server 3B (#703).

Upon receiving one or more scanned images 7B (#721 of FIG. 15), the support server 3B extracts the target image 7A from each scanned image 7B (#722). Then, a first target image 7A is focused on (#723), and a process similar to steps #605 to #612 of the first embodiment is performed (#724 to #731). Accordingly, the application service of the first target image 7A is selected.

The support server 3B transmits the screen data of the confirmation screen 8A (see FIG. 5) to the image forming device 1A (#732) to inquire of the user 80 about whether or not the selected application service is applied.

Upon receiving the screen data (Yes in #704), the image forming device 1A displays the confirmation screen 8A on the basis of the screen data (#705). Then, data indicating content of an operation performed by the user on the confirmation screen 8A is transmitted to the support server 3B as the response data 61 (#706).

Upon receiving the response data 61 (#733), the support server 3B decides the application service of the focused target image 7A on the basis of the response data 61 and executes the process corresponding to the decided application service on the target image 7A (#734). Accordingly, the file of the adjusted image 7C is generated from the target image 7A. Then, the generated file is transferred to the alliance program 30P of the application service (#735).

The support server 3B similarly focuses on the second and subsequent target images 7A sequentially (No in #736 and #737) and executes the process of steps #724 to #735. When the process of steps #724 to #735 is completed for all the target images 7A (Yes in #736), a notification indicating the process is completed is given to the image forming device 1A (#738).

The image forming device 1A executes the process of steps #705 to #706 each time the screen data is received until the notification of the completion is received.

According to the second embodiment, similarly to the first embodiment, in order to receive the service, it is possible to more easily transfer the target image 7A to the service provider server 2 than in the related art. Further, since the support server 3B other than each image forming device 1 decides the providing source, the load of each image forming device 1 can be reduced.

In the second embodiment, the user is caused to confirm the application service through the confirmation screen 8A for each target image 7A, but the confirmation may be performed for all of a plurality of target images 7A through the all-inclusive confirmation screen 8B or the all-inclusive confirmation screen 8C.

Figure 16:
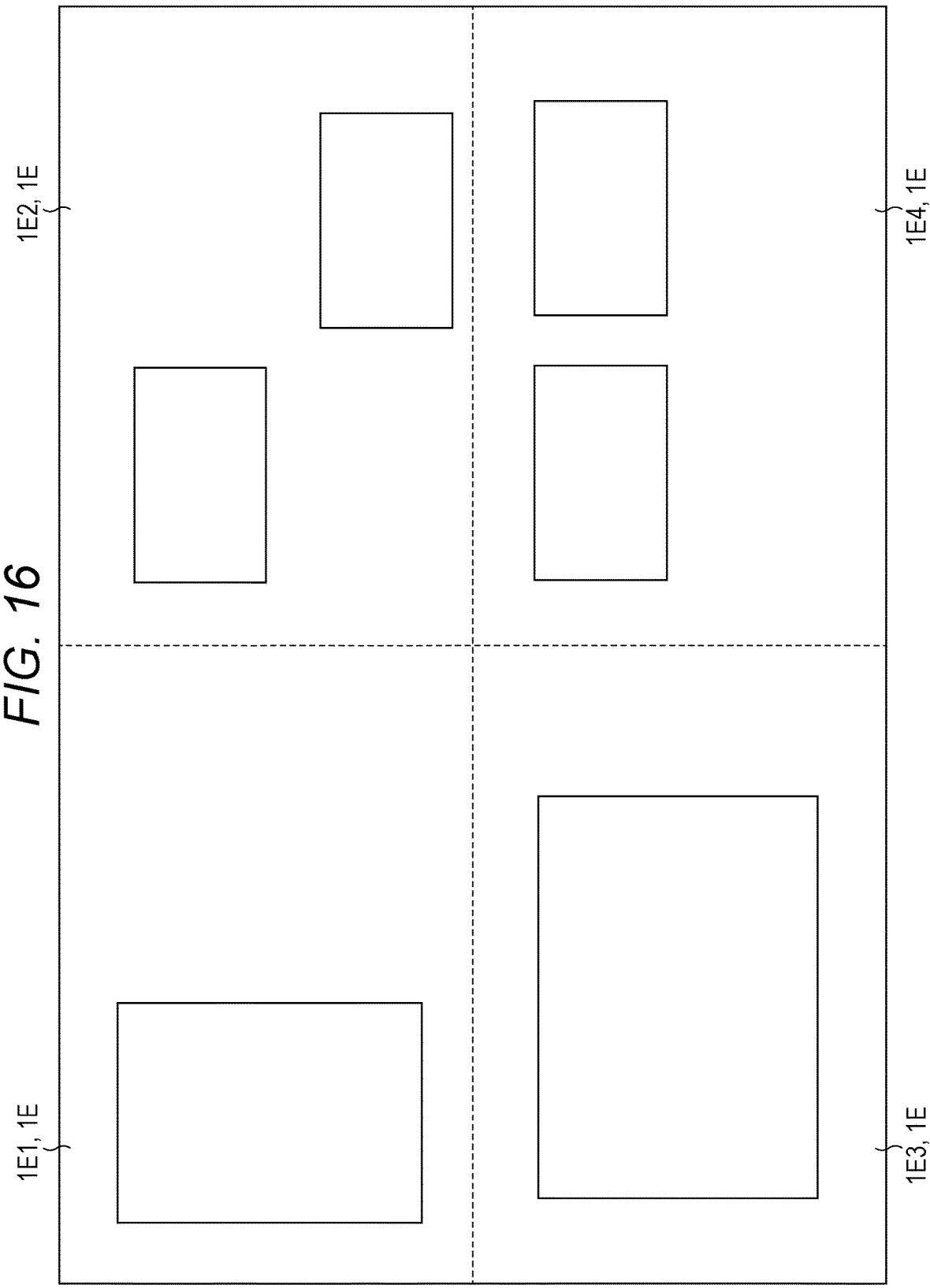
FIG. 16 is a diagram illustrating an example of a divisional region.
Figure 17:
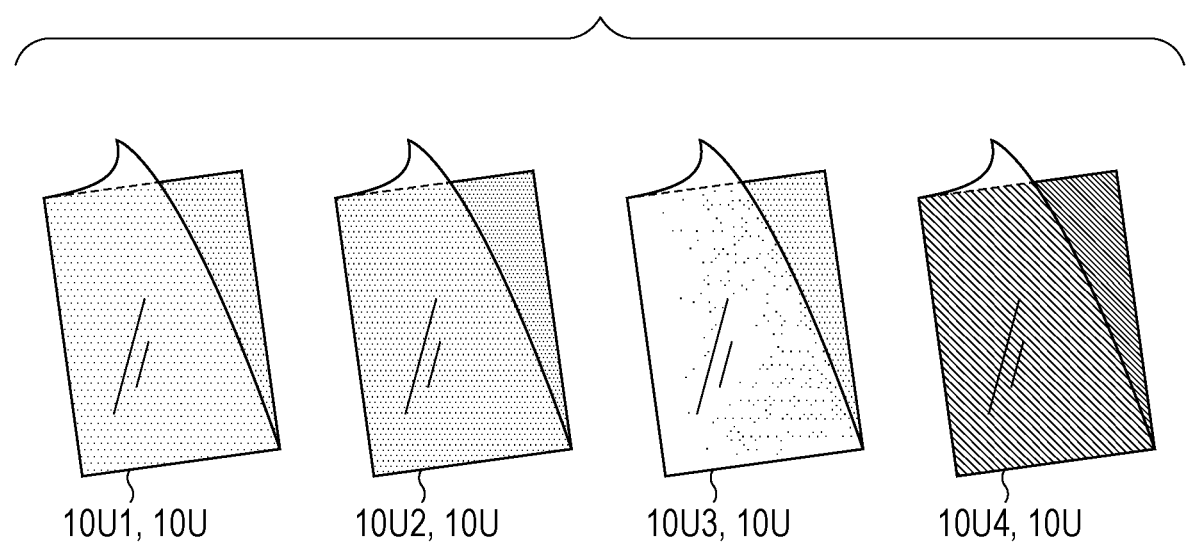
FIG. 17 is a diagram illustrating an example of a case.

FIG. 16 is a diagram illustrating an example of divisional regions 1E1 to 1E4. FIG. 17 is a diagram illustrating an example of cases 10U1 to 10U4.

In the first and second embodiments, the service selector 105 selects one of the services as the application service on the basis of a predetermined rule when a plurality of services which are desirable to be applied to one target image 7A are determined by the suitability determiner 104. However, the touch panel display 10e may be caused to display these services, and the user may be caused to select a service used as the application service.

In the first and second embodiments, the image forming device 1 or the support server 3B selects the application service of the target image 7A on the basis of a satisfaction degree of the condition, but the application service of the target image 7A may be selected by the following method.

The platen glass of scanning unit 10i is divided into divisional regions 1E which correspond in number to services. One divisional region 1E is assigned to each service. For example, in a case in which there are the expense settlement service, the business card management service, the translation service, and the my number collection service, the platen glass is divided into four divisional regions 1E1 to 1E4 as illustrated in FIG. 16, and the expense settlement service, the business card management service, the translation service, and the my number collection service are assigned to the divisional regions 1E1, 1E2, 1E3, and 1E4, respectively.

The scanning unit 10i scans the scanned image 7B by scanning the entire platen glass.

The image forming device 1 or the support server 3B selects the service to which the divisional region 1E is assigned as the application service of the target image 7A scanned from a certain divisional region 1E in the scanned image 7B. For example, the expense settlement service is selected as the application service of target image 7A scanned from the divisional region 1E1.

Alternatively, the application service may be selected by the following method. A color is assigned to each service in advance. For each service, a bag-like case 10U in which a front side sheet is transparent and a back side sheet corresponds to a color of the service is prepared. The case 10U is also referred to as a "clear file", a "clear case", a "clear folder", or the like.

For example, in a case in which red, blue, yellow, and green are assigned to the above four services, four cases 10U1 to 10U4 in which the back side sheets are red, blue, yellow, and green are prepared as illustrated in FIG. 17.

The user 80 inserts a sheet in the case 10U of the service which is desired to be received so that a print side faces a front side. A plurality of sheets may be inserted. Then, the user 80 sets the case 10U on the platen glass of the scanning unit 10i and presses the start key. In this case, the target image 7A recorded on the sheet is scanned together with the sheet on the back side through the scanning unit 10i.

Then, the service selector 105 selects a service corresponding to a color of a margin part of the scanned image 7B as the application service of the target image 7A included in the scanned image 7B. For example, if the color of the margin part is yellow, the translation service is selected.

In the present embodiment, the examples of the service include the expense settlement service, the business card management service, the translation service, and the my number collection service, but the present invention can be applied even in a case in which other services are received. The image forming device 1 or the support server 3B can be used for a plurality of same types of services. For example, a company may subscribe to a first expense settlement service and a second expense settlement service as a service for settling expenses, domestic business trip expenses may be settled through the first expense settlement service, and abroad business trip expenses may be settled through the second expense settlement service.

In the present embodiment, the client program 10P or the alliance program 30P uploads the adjusted image 7C to the server 2. However, in a case in which an application program interface (API) of a web application in the server 2 is disclosed, an uploading function may be realized in the image delivery program 10R or the service intermediate program 30R.

In the present embodiment, the service provided by the server 2 has been described as an example, but the present invention can be applied to a service provided by the image forming device 1 itself.

In the present embodiment, the image forming device 1 acquires the target image 7A through the scanning unit 10i, but in a case in which a universal serial bus (USB) port is installed in the image forming device 1, the target image 7A may be acquired by receiving image data from a USB memory. Alternatively, an image captured by a digital camera may be acquired as the target image 7A or the scanned image 7B. Alternatively, the target image 7A may be acquired by reading image data stored in a box.

In addition, the configurations of some of all of the service providing systems 5 and 5B and the image forming device 1, the processing content, the processing order, the data configuration, the screen configuration, or the like can be changed as appropriate in accordance with the gist of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A service use support device used for receiving a plurality of services, comprising
a hardware processor that:
acquires one or more of target images to be processed;
selects a preferred service from among the plurality of services for each of the one or more of target images on the basis of a degree at which each attribute satisfies a condition set for each of the plurality of services; and
transfers each of the one or more of target images to a provider that provides each preferred service.

2. The service use support device according to claim 1, wherein
an expense settlement service for settling expenses is included in the plurality of services, and
the hardware processor selects the expense settlement service as the preferred service of a target image including a predetermined number or more of character strings among a character string indicating an amount of money, a character string indicating a date, a character string indicating a receipt, and a character string indicating a company name among the one or more of target images.

3. The service use support device according to claim 1, wherein
a business card management service for managing a business card is included in the plurality of services, and
the hardware processor selects the business card management service as the preferred service of a target image including a predetermined number or more of character strings or image among a character string indicating a name, a character string indicating a company name, a character string indicating an address, a character string indicating a telephone number, a character string indicating an e-mail address, and an image of a face among the one or more of target images.

4. The service use support device according to claim 1, further comprising
a display that selectively displays a specific screen prepared for each language, wherein
a translation service for translating a document written in a first language into a second language is included in the plurality of services, and
the hardware processor selects the translation service as the preferred service of an image of interest in a case in which a predetermined number or more of conditions among a first condition in which a language describing a document indicated by the image of interest is different from a language normally used by a user who uses the service use support device, a second condition in which the language describing is the second language, and a third condition in which the specific screen of a predetermined language is set to be displayed on the display are satisfied among the one or more of target images.

5. The service use support device according to claim 1, wherein
any one of a plurality of colors is assigned to each of the plurality of services in a non-overlapping manner, and
the hardware processor acquires the one or more of target images by extracting the one or more of target images from a scanned image obtained by collectively scanning a plurality of sheets which are arranged to have one of the plurality of colors as a background, and selects a service to which a color of a part other than the one or more of target images in the scanned image is assigned among the plurality of services as the preferred service.

6. The service use support device according to claim 1, wherein
the hardware processor acquires the one or more of target images by extracting the one or more of target images from a scanned image obtained by scanning a specific region in which a plurality of sheets are arranged, and selects the preferred service of each of the one or more of target images on the basis of positions at which the one or more of target images are extracted in the scanned image.

7. The service use support device according to claim 1, wherein
in a case in which there is a plurality of preferred services for any one of the one or more of target images, the hardware processor selects one of the plurality of preferred services on the basis of a predetermined rule or by causing the user to select one of the plurality of preferred services.

8. The service use support device according to claim 1, wherein
the hardware processor acquires the one or more of target images with a condition of a certain criterion regarding an image quality or more, and executes a process corresponding to each of the preferred services and transfers each of the one or more of target images.

9. The service use support device according to claim 1, wherein
the hardware processor displays a confirmation screen in which target images which are the same in the preferred services among the one or more of target images are arranged, and re-selects the preferred service in accordance to an operation on the confirmation screen.

10. A service use method of receiving a plurality of services, comprising:
acquiring one or more of target images to be processed;
selecting a preferred service from among the plurality of services for each of the one or more of target images on the basis of a degree at which each attribute satisfies a condition set for each of the plurality of services; and
transferring each of the one or more of target images to a provider that provides each preferred service.

11. A non-transitory recording medium storing a computer readable program used in a computer for receiving a plurality of services, the computer program causing the computer to perform:
acquiring one or more of target images to be processed;
selecting a preferred service from among the plurality of services for each of the one or more of target images on the basis of a degree at which each attribute satisfies a condition set for each of the plurality of services; and
transferring each of the one or more of target images to a provider that provides each preferred service.

* * * * *